United States Patent Office.

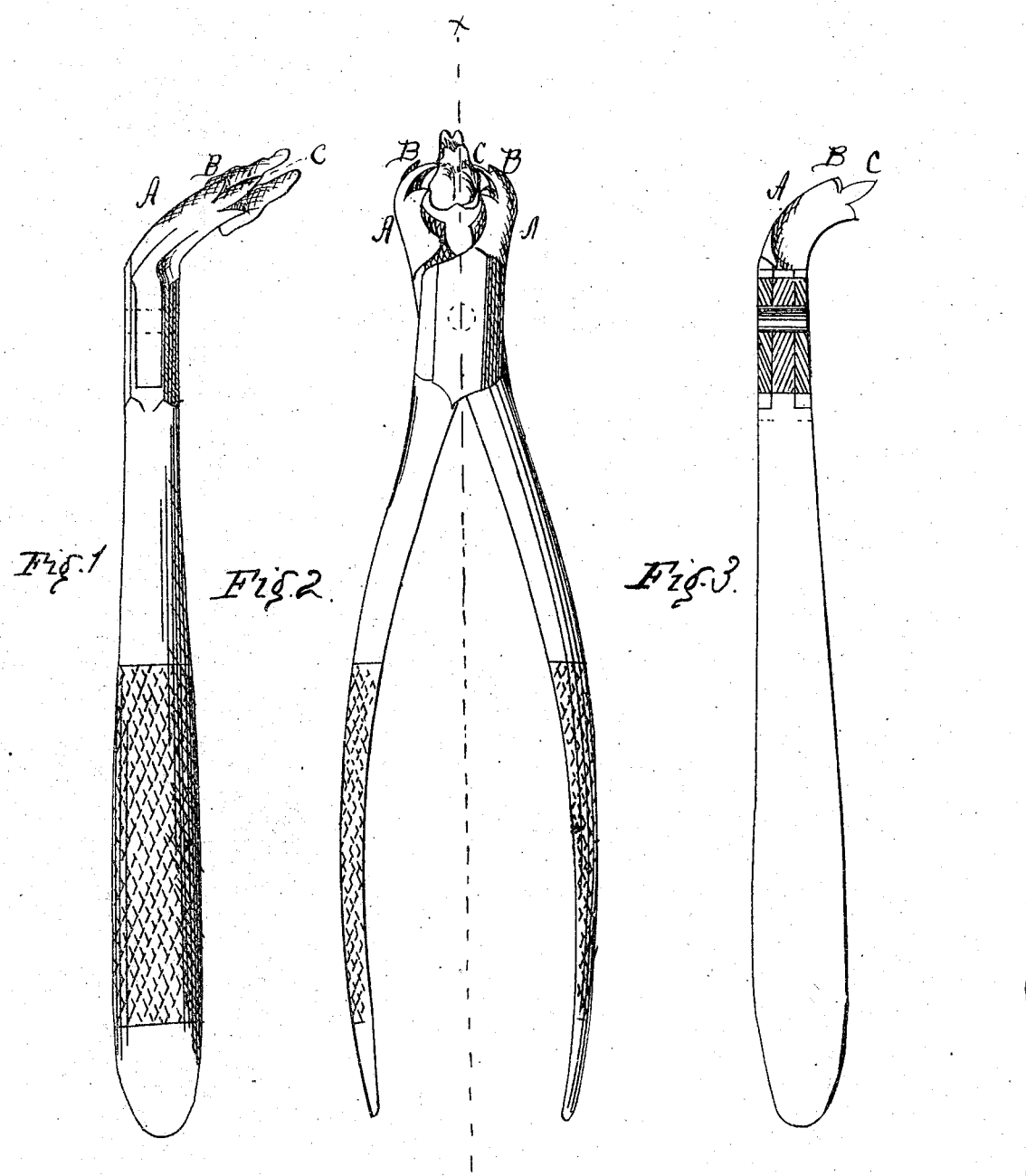

SAMUEL WOOLVERTON, OF TRENTON, NEW JERSEY, ASSIGNOR TO HIMSELF GEORGE L. TAYLOR, AND LEWIS PARKER, JR.

Letters Patent No. 75,716, dated March 17, 1868.

IMPROVEMENT IN DENTAL FORCEPS.

The Schedule referred to in these Letters Patent and making part of the same.

Be it known that I, SAMUEL WOOLVERTON, of Trenton, in the county of Mercer, and State of New Jersey, have invented certain new and useful Improvements in Dental Molar-Forceps; and I do hereby declare that the following is a full and exact description thereof, reference being had to the accompanying drawings, and to the letters of reference marked thereon.

Figure 1 represents a longitudinal bisection, showing the exterior side of the forceps.

Figure 2 represents the perspective view of my improvement, showing the manner in which the tooth is held.

Figure 3 represents an inside view of a bisection.

My invention consists in providing both jaws of lower molar-forceps with a horn and crescent-beak combined, and in upper molar-forceps with the crescent and horn on one jaw, and the crescent alone on the other.

To enable others skilled in the art to make and use my invention, I will proceed to describe the same.

Similar letters of reference, where they occur, denote like parts in all the drawings.

Letter A represents the bent or curved jaw of the forceps, the inner side of which is concave, so as to admit and closely fit the crown and neck of molar teeth. B represents the crescent at the end of the jaw. C represents the horn projecting in a curved line from the centre of the crescent, so that when the forceps are closed, the horns nearly meet each other.

When these forceps are applied, by simply closing them upon a molar tooth, the horns force their own way directly under the body of the tooth, between the roots, and the crescents firmly clasp the neck of the tooth, preventing both the breaking and slipping of the tooth from the jaws of the forceps. The tooth is therefore immediately loosened from the alveolar process, and is more easily extracted, without the liability of its being broken.

Having thus fully described my invention, what I claim as new, and desire to secure by Letters Patent, is—

Dental molar-forceps, when provided with horn and crescent-beak combined, substantially as described and for the purpose set forth.

SAMUEL WOOLVERTON.

Witnesses:
ROBERT I. WOODRUFF, Jr.,
JOHN T. TEMPLE.